United States Patent [19]

Hoenig et al.

[11] Patent Number: 5,286,786

[45] Date of Patent: Feb. 15, 1994

[54] PROCESS FOR PRODUCING STABILIZED ETHYLENE CARBON MONOXIDE INTERPOLYMERS

[75] Inventors: Stephen M. Hoenig, Lake Jackson; Gregory E. Johnson, Brazoria; Gerald M. Lancaster, Freeport, all of Tex.

[73] Assignee: The Dow Chemical Company, Midland, Mich.

[21] Appl. No.: 911,242

[22] Filed: Jun. 30, 1992

Related U.S. Application Data

[63] Continuation of Ser. No. 699,426, May 13, 1991, abandoned.

[51] Int. Cl.[5] ................................. C08K 5/13
[52] U.S. Cl. .................... 524/740; 524/791; 528/232
[58] Field of Search ............ 524/740, 791; 528/232

[56] References Cited

U.S. PATENT DOCUMENTS

| | | | |
|---|---|---|---|
| 2,436,269 | 2/1948 | Scott | 260/537 |
| 2,495,255 | 1/1950 | Hoehn | 260/63 |
| 2,495,286 | 1/1950 | Brubaker | 260/63 |
| 2,495,292 | 1/1950 | Scott | 260/66 |
| 2,641,590 | 6/1953 | Little, Jr. | 260/63 |
| 3,083,184 | 3/1963 | Loeb | 260/63 |
| 3,248,359 | 4/1966 | Maloney | 260/41 |
| 3,530,109 | 9/1970 | Fenton | 260/94.9 |
| 3,676,401 | 7/1972 | Henry | 260/63 CQ |
| 3,689,460 | 9/1972 | Nozaki | 260/63 |
| 3,694,412 | 9/1972 | Nozaki | 260/63 |
| 3,780,140 | 12/1973 | Hammer | 260/884 |
| 3,835,123 | 9/1974 | Nozaki | 260/94.9 B |
| 3,929,727 | 12/1975 | Russell et al. | 260/45.95 F |
| 3,948,832 | 4/1976 | Hudgin | 260/23 EP |
| 3,948,850 | 4/1976 | Hudgin | 260/45.7 |
| 3,968,082 | 7/1976 | Hudgin | 260/45.85 H |
| 3,988,509 | 10/1976 | Ballard et al. | 528/491 |
| 4,024,325 | 5/1977 | Hudgin | 526/11.1 |
| 4,024,326 | 5/1977 | Hudgin | 526/11.1 |
| 4,139,522 | 2/1979 | Lantos | 260/45.75 R |
| 4,143,096 | 3/1979 | Hudgin | 260/878 R |
| 4,192,942 | 3/1980 | Mainord | 260/597 R |
| 4,304,887 | 12/1981 | Cohen | 525/329 |
| 4,473,482 | 9/1984 | Serres et al. | 252/52 R |
| 4,594,382 | 6/1986 | Hoenig et al. | 524/400 |
| 4,616,072 | 10/1986 | White | 525/539 |
| 4,786,716 | 11/1988 | Van Broekhoven et al. | 528/487 |
| 4,814,378 | 3/1989 | Lutz | 525/55 |
| 4,847,155 | 7/1989 | Lancaster et al. | 428/421 |
| 4,954,548 | 9/1990 | Klingensmith | 524/258 |
| 4,960,808 | 10/1990 | Schmitter | 524/222 |
| 4,992,499 | 2/1991 | Syrier et al. | 524/291 |

*Primary Examiner*—Kriellion S. Morgan

[57] ABSTRACT

A process is described for stabilizing the melt flow rate and melt tension of ethylene-carbon monoxide interpolymers with a hindered phenol antioxidant. The antioxidant is melt blended with the polymer before it is exposed to air.

12 Claims, No Drawings

PROCESS FOR PRODUCING STABILIZED ETHYLENE CARBON MONOXIDE INTERPOLYMERS

CROSS-REFERENCE TO RELATED APPLICATION

This is a continuation of application Ser. No. 07/699,426, filed May 13, 1991 now abandoned.

FIELD OF THE INVENTION

This invention relates to a process for stabilizing the melt flow rate and melt tension of ethylene-carbon monoxide interpolymers with a hindered phenolic antioxidant. The antioxidant is melt blended with the polymer before the polymer is exposed to air.

BACKGROUND OF THE INVENTION

Ethylene-carbon monoxide interpolymers (ECO) are a known class of compounds which are typically prepared by high pressure, free-radical initiated polymerization reactions. See, for example, U.S. Pat. Nos. 2,495,292; 2,436,269; 2,495,255; 2,495,286; 3,248,359; 3,780,140; 4,024,325; and 4,024,326 which are incorporated herein by reference. It is also known to produce ECO interpolymers by coordination catalytic means as described in U.S. Pat. Nos. 2,641,590; 3,083,184; 3,530,109; 3,689,460; 3,694,412; and 3,835,123, which are incorporated herein by reference.

ECO polymers are known to have poor resistance to thermal degradation during post-polymerization processing. Viscosity changes have even been observed when the ECO polymers are stored for extended periods of time at ambient conditions (e.g. warehouse conditions). The changes in melt flow rate and melt tension of the ECO polymers can render them unacceptable for subsequent processing and use. The stability problems are particularly severe for ECO polymers having a high carbon monoxide content (e.g., about 10 mole percent).

U.S. Pat. Nos. 3,948,850; 3,948,832; 3,968,082 to Hudgin and 3,929,727 to Russell et al. describe compounds said to be useful for preventing gelling, formation of surface skin and color change of ECO polymers.

U.S. Pat. No. 4,139,522 to Lantos describes manganous salts of phosphorus oxy acids useful for preventing ECO polymers from crosslinking during processing operations at elevated temperatures.

U.S. Pat. No. 4,954,548 to Klingensmith describes UV stabilization of ECO polymer compositions with an aromatic diamine and carbon black.

U.S. Pat. No. 4,814,378 to Lutz describes a polymer blend of an ECO polymer and a vinyl aromatic compound with an $\alpha,\beta$-unsaturated cyclic anhydride copolymer which is said to have improved processability and melt stability.

A persistent stability problem with ECO remains. As far as applicant is aware, no solution has been devised for effectively stabilizing ECO polymers against viscosity changes at ambient temperatures and above, and ECO polymers have been limited in their use. Accordingly, there remains a need for a method for producing ECO interpolymers which are viscosity stable at conditions of transportation, storage and use.

SUMMARY OF THE INVENTION

The present invention provides process technology by which viscosity-stabilized ECO polymers are obtained. The novel process comprises intimately melt blending the ECO interpolymer with a hindered phenolic antioxidant prior to exposing the interpolymer to air. The hindered phenol is added in an effective amount to viscosity-stabilize the ECO polymer blend. The resulting blend has a stable melt flow rate and melt tension under ambient conditions of transportation and storage and under conditions of use in melt processing operations.

In another aspect, the invention provides a new viscosity-stabilized ethylene-carbon monoxide interpolymer.

DETAILED DESCRIPTION OF THE INVENTION

Any of the known class of ECO interpolymers, or mixtures thereof can be used in the present invention.

In a conventional ethylene-carbon monoxide (ECO) polymerization, ethylene, carbon monoxide and a free-radical initiator are charged to a high pressure polymerization reactor and maintained at suitable temperature and pressure to interpolymerize the ethylene and carbon monoxide. Reactor pressures are typically maintained at from about 70 MPa (10,000 psi) to about 350 MPa (50,000 psi), preferably from about 100 (14,500 psi) MPa to about 200 (29,000 psi) MPa, and reactor temperature at from about 50° C. to about 300° C., preferably from about 100° C. to about 250° C. The reactor can be of any suitable type, such as, for example, stirred autoclave, tubular, batch, continuous, etc. The free-radical initiator can be oxygen; an organic peroxide (e.g., t-butyl peroctoate, benzol peroxide, lauryl peroxide, t-butyl peroxypivalate, di-t-butyl peroxide, di(2-ethylhexyl) peroxy dicarbonate, t-butyl peracetate and the like) ; or an azo compound (e.g., azobis(1-cyano-1,4-dimethylbutane), azobisisobutyronitrile and the like). The initiator is preferably an azo compound, although the invention is not restricted to the choice of initiator.

As is known in the art, an inert organic solvent may be employed to transfer optional monomers and/or initiator into the reactor. Especially where relatively small proportions of these components make accurate metering difficult, employment of a solvent is preferred. Such solvents generally include, for example, methylethylketone and isooctane. It is also known to employ a chain transfer agent such as, for example, isobutane, to control the average molecular weight of the interpolymer within selected ranges.

Generally, the ECO interpolymer is recovered from the reactor by means of a letdown valve and a series of separators. Typically, a high pressure separator receives the interpolymer and unreacted monomer directly from the reactor. The high pressure separator is generally operated at a pressure of from about 15 (2000 psi) MPa to about 24 (3500 psi) MPa. A low pressure separator receives the interpolymer and residual unreacted monomer from the high pressure separator. The low pressure separator is typically operated at a pressure of from about 0 kPa to about 500 kPa (gauge). The ECO interpolymer is then discharged from the low pressure separator into a feed port of a primary extruder (which may be equipped with a devolatilization zone(s) for residual monomer removal) operating at a temperature above the melting point of the polymer. The extrudate is then typically pelletized using conventional equipment, such as, for example, an underwater pelletizer. The pelletized ECO interpolymer is typically air dried and subsequently stored for shipment and use. It is common for the ECO interpolymers to be formulated with various additives by dry blending and/or melt blending the pelletized ECO with the additives in conventional equipment, such as, for example, Brabenders, roll mills and the like.

Free-radical initiated polymers can generally be distinguished from coordination catalyzed polymers in that the former are generally branched, whereas the coordination catalyzed polymers tend to be less branched and more linear. The present improvement is particularly applicable to free-radical initiated ECO polymers having a relatively high Co content, e.g. above about 5 percent by weight. Viscosity stability is less of a problem in ECO polymers containing lower levels of Co, so the benefits derived from the addition of stabilizers thereto according to the present invention are not as pronounced as the stabilization observed in ECO polymers having higher CO contents, e.g. above about 10 or 15 percent by weight. There does not appear to be any upper limit on the CO content of ECO which may be effectively stabilized in accordance with the present invention, although as a practical matter, ECO containing more than about 35 percent by weight Co is difficult to prepare commercially. Thus, the ECO polymers preferably have a CO content of from about 5 to about 35 percent by weight, more preferably above about lo percent by weight, and especially above about 15 percent by weight.

The ECO polymer blends produced by this process have a melt flow rate from about 0.1 to about 300 dg/min, preferably from about 1 to about 100 dg/min. As used herein, melt flow rate (MFR) is determined in accordance with ASTM D-1238, Condition E (190° C./2.16 kg). The ECO polymer blends generally have a melt tension less than about 8, preferably less than about 6. As used herein, melt tension (MT) is measured as an extrudate from a Tinius-Olsen Extrusion Plastometer model MP987 over a range of 30-3000 rpm at 2 Conditions of 190° C. and 2.16 kg weight.

The ECO interpolymers of the present invention can include a minor proportion of another monomer in the polymer chain. Suitable termonomers include, for example, $C_3-C_8$ aliphatic olefins (e.g., propylene, butene-1, hexane-1, octane-1, and the like) and/or ethylenically unsaturated organic acids having 3 to 8 carbon atoms (e.g., acrylic acid, methacrylic acid, 1-butenoic acid, and the like); and alkyl esters or metal salts of these acids (e.g., ethyl acrylate, methyl methacrylate, 2-ethylhexyl acrylate, sodium acrylate, potassium methacrylate, and the like). Hydrogenated CO-containing ethylene polymers (which have H—C—OH groups along the polymer chain) such as the hydrogenated ECO disclosed in U.S. Pat. No. 2,495,292, are also suitable polymers for use in the present invention.

The hindered phenolic antioxidant which is added to the ECO polymers according to the present invention form a known class of compounds which includes, for example, tetrakis(methylene-3-(3,5-di-t-butyl-4-hydroxyphenyl)propionate)methane; 2,6-di-t-butyl-p-cresol; 2-t-butyl-4-hydroxyanisole; 3-t-butyl-4-hydroxyanisole; and 2,6-di-t-butyl-4-sec-butylphenol. Of these, tetrakis(-methylene-3-(3,5-di-t-butyl-4-hydroxy-phenyl)propionate)methane is especially preferred.

The hindered phenolic antioxidant should be in intimate admixture with the ECO polymer such that it is distributed substantially uniformly throughout the polymer composition. Thus, the hindered phenolic antioxidant is generally added to the ECO polymer in a readily dispersible form, such as, for example, in a finely divided state or dissolved in a solvent.

In preparing the composition of the invention, the hindered phenolic antioxidant is added to the ECO in an amount effective to impart viscosity-stability thereto upon intimate mixing therewith. Concentrations below about 500 ppm are generally not sufficiently effective, whereas there is generally no additional stabilization observed above concentrations of about 5000 ppm, and in addition, above such concentrations, other properties of the ECO can be adversely affected. Thus, it is preferred to use at least about 500 ppm of the scavenger, and more preferably from about 1000 to about 5000 ppm.

The hindered phenolic antioxidant and the ECO polymer are intimately mixed under conditions at which the ECO is in a molten state. It is essential that the hindered phenolic antioxidant addition and mixing are performed prior to exposing the ECO product to air. it has been found, quite surprisingly, that ECO polymers stabilized according to the present invention have enhanced viscosity stabilization over "equivalent" polymer blends formed by dry blending the hindered phenolic antioxidant with pelletized ECO, or even melt blending the hindered phenolic antioxidant with an ECO which has been exposed to air more than one or two hours following production of the ECO, which are ineffective in obtaining viscosity-stabilization of the ECO.

The hindered phenolic antioxidant may be added to the ECO at any convenient point downstream of the copolymerization reactor vessel but prior to exposing the ECO polymer to air. Typical equipment downstream of the reactor includes separators in which the unreacted monomers and ethylene are removed from the molten ECO, primary extruders, and finishing extruders. Mixing is generally accomplished by the shear imparted to the blend as it passes through the processing equipment. Other mixing equipment which may be suitably employed includes compounding extruders, Banbury mixing extruders, intensive mixing or multi-screw extruders, roll mills or the like.

The invention is illustrated by way of the following examples:

EXAMPLES 1-3 AND COMPARATIVE EXAMPLE A

In the following examples and comparative example, ECO interpolymers having 10 weight percent CO content were produced in a conventional high pressure autoclave reactor and discharged into a high pressure separator, a low pressure separator, and then into the feed port of a primary extruder and pelletized: Examples 1-3 had varying concentrations of IRGANOX 1010 added to the polymer either in the low pressure separator (LPS) (Example 1) or in the high pressure separator (HPS) (Examples 2-3) while comparative Example A had no antioxidant added. Additive concentrations and initial MFR and MT data are presented in Table IV below.

TABLE I

| Example | Comp. A | 1 | 2 | 3 |
|---|---|---|---|---|
| IRGANOX 1010 (ppm) | 0 | 1400 | 612 | 656 |
| Initial MFR (dg/min) | 10.1 | 10 | 10 | 10 |
| Initial MT (g) | 3.38 | 3.45 | 2.65 | 2.85 |

The pelletized resins were stored under ambient conditions in a polyethylene bag and their melt tension (MT) was monitored following production. The test results are shown in Table II below.

TABLE II

| Time Since Production (hours) | MT (g) | | | |
|---|---|---|---|---|
| | Comp. A (0 ppm) | Example 1 (1400 ppm) | Example 2 (612 ppm) | Example 3 (656 ppm) |
| 0 | 3.41 | 3.5 | 2.65 | 2.85 |
| 1 | 5.3 | 3.7 | 2.90 | 2.90 |
| 2 | 4.5 | 3.8 | 3.05 | 3.5 |
| 4 | — | — | 3.1 | 3.72 |
| 8 | — | — | 3.35 | 3.75 |
| 10 | 4.3 | 3.6 | — | — |
| 12 | — | — | 3.55 | 3.7 |
| 14 | 4.8 | 3.4 | — | — |
| 22 | 4.4 | — | — | — |
| 24 | — | — | 3.8 | 3.0 |
| 26 | 4.4 | — | — | — |
| 48 | — | — | 3.55 | 3.7 |
| 50 | 5.6 | — | — | — |
| 72 | — | — | 3.8 | 3.78 |
| 74 | 6.8 | 3.7 | — | — |
| 97 | 6.0 | 4.5 | — | — |
| 121 | 7.3 | 4.2 | — | — |
| 144 | — | — | 4.0 | 3.73 |
| 145 | 8.0 | 3.7 | — | — |
| 192 | — | — | 3.35 | 4.3 |
| 216 | — | — | 3.5 | 3.68 |
| 240 | — | — | 4.1 | 3.62 |
| 241 | CNA | 4.1 | — | — |
| 265 | CNA | 3.7 | — | — |
| 289 | CNA | — | — | — |
| 313 | CNA | — | — | — |

Notes for Table II:
— = Not analyzed.
CNA = Too high to measure.

Example 1 is similar in every respect to Comparative Example A except that 1400 ppm IRGANOX 1010 was added to the LPS. The viscosity as represented by MT, of the Comparative Example A increased unacceptably under ambient temperature storage while the polymer in Examples 1, 2 and 3 were substantially viscosity stable.

The viscosity increase in Comparative Example A rendered the ECO unacceptable f or subsequent processing and use where consistent performance is required. By contrast, the viscosity (MT) of Example 1 had not changed even after 265 hours in storage.

EXAMPLES 4–6 AND COMPARATIVE EXAMPLES B–D

Additional ECO interpolymers (10 weight percent CO, 10 MFR) were prepared and MT monitoring was performed as described above except that the samples were made in another high pressure autoclave reactor and the hindered phenolic antioxidant, IRGANOX 1010, additive was only injected into the HPS.

Results in Table III below show significant increases in MT for the resins in Comparative Examples B, C and D without IRGANOX 1010. After 260 hours of storage at ambient conditions the MT of Comparative Examples B, C and D could not be measured. However, Examples 4–6, prepared with 780, 704 and 1050 ppm IRGANOX 1010 added to the HPS, demonstrated excellent viscosity stabilization over time.

TABLE III

| Time Since Production (hours) | MT (g) | | | | | |
|---|---|---|---|---|---|---|
| | Comp. B (0 ppm) | Comp. C (0 ppm) | Comp. D (0 ppm) | Ex 4 (780 ppm) | Ex. 5 (704 ppm) | Ex. 6 (1050 ppm) |
| 0 | 3.9 | 4.7 | 4.5 | 4.5 | 2.3 | 2.4 |
| 216 | 7.9 | CNA | 9.8 | 4.5 | 2.6 | 2.2 |
| 360 | CNA | CNA | CNA | 6.0 | 3.0 | 2.4 |

Having described the invention above, many variations in the materials, proportions and method of preparation, as well as in the illustrated details of the improvement, will occur to those skilled in the art. it is intended that all such variations which fall within the scope and spirit of the appended claims be embraced thereby.

What is claimed is:

1. In a method for preparer ethylene-carbon monoxide interpolymer for ambient-temperature transportation and storage for an extended period of time, comprising polymerizing a monomer mixture containing ethylene and carbon monoxide in the presence of a free radical polymerization initiator in a copolymerization reaction vessel, and recovering an ethylene-carbon monoxide interpolymer containing at least about 10 up to about 35 percent by weight carbon monoxide in interpolymerized form, the improvement wherein the recovered interpolymer is intimately melt blended with form about 500 to about 5000 ppm of a hindered phenol antioxidant, downstream of the copolymerization reaction vessel prior to exposure to air, effective ti impart a stable melt flow rate and melt tension to the recovered interpolymer.

2. The improvement of claim 1, wherein said interpolymer comprises a small proportion of a termonomer having between 3 to about 8 carbon atoms selected from the group consisting of aliphatic olefins and unsaturated carboxylic acids and salts and alkyl esters thereof.

3. The improvement of claim 1, wherein said hindered phenol is tetrakis(methylene-3-(3,5-di-t-butyl-4-hydroxyphenyl)propionate)methane, 2,6-di-t-butyl-p-cresol, 2-t-butyl-4-hydroxyanisole, 3-t-butyl-4-hydroxyanisole, or 2,6-di-t-butyl-4-sec-butylphenol.

4. The improvement of claim 1, wherein said hindered phenol is tetrakis(methylene-3-(3,5-di-t-butyl-4-hydroxyphenyl)propionate)methane.

5. The improvement of claim 1, wherein said hindered phenol is blended in amount of from about 1000 to about 5000 ppm of the resulting blend.

6. The improvement of claim 1, wherein said hindered phenol is added to said interpolymer in a separator or primary extruder downstream of a polymerization reactor.

7. The stabilized interpolymer produced by the improved method of claim 1.

8. The stabilized interpolymer produced by the improved method of claim 2.

9. The stabilized interpolymer produced by the improved method of claim 3.

10. The stabilized interpolymer produced by the improved method of claim 4.

11. The stabilized interpolymer produced by the improved method of claim 5.

12. The stabilized interpolymer produced by the improved method of claim 6.

* * * * *